United States Patent [19]
Van Witt et al.

[11] Patent Number: 5,738,221
[45] Date of Patent: Apr. 14, 1998

[54] COMPACT DISC HOLDER PACKAGE CONTAINING A THREE-DIMENSIONAL POP-UP DISPLAY

[75] Inventors: Peter Van Witt, Westport; Paul Zalon, Southport, both of Conn.; David Burton, New York, N.Y.

[73] Assignee: Popshots Intellectual Property, LLC, Westport, Conn.

[21] Appl. No.: 489,306

[22] Filed: Jun. 9, 1995

[51] Int. Cl.⁶ .................................................. A65D 85/30
[52] U.S. Cl. ........................... 206/768; 40/124.1; 40/539; 206/308.1
[58] Field of Search .................... 206/309, 311, 206/312, 308.1, 457, 459.5, 768, 307; 40/124.1, 539

[56] References Cited

U.S. PATENT DOCUMENTS

| | | | |
|---|---|---|---|
| 2,148,279 | 2/1939 | Sandberg | 40/124.1 |
| 2,511,211 | 6/1950 | Klein et al. | 40/124.1 |
| 3,430,761 | 3/1969 | Pelkey . | |
| 3,561,671 | 2/1971 | Minot, Jr. et al. | 206/312 X |
| 4,433,780 | 2/1984 | Ellis . | |
| 4,592,573 | 6/1986 | Crowell | 40/124.1 X |
| 4,640,413 | 2/1987 | Kaplan et al. | 206/312 X |
| 4,709,812 | 12/1987 | Kosterka . | |
| 4,736,840 | 4/1988 | Deiglmeier | 206/308.1 |
| 4,774,780 | 10/1988 | Crowell . | |
| 4,840,275 | 6/1989 | Faiola et al. . | |
| 4,874,356 | 10/1989 | Volkert . | |
| 4,885,859 | 12/1989 | Gasser . | |
| 5,011,010 | 4/1991 | Francis et al. . | |
| 5,022,681 | 6/1991 | Penick . | |
| 5,085,318 | 2/1992 | Leverick . | |
| 5,088,599 | 2/1992 | Mahler | 206/308.1 |
| 5,101,971 | 4/1992 | Grobecker . | |
| 5,101,973 | 4/1992 | Martinez . | |
| 5,133,496 | 7/1992 | Davidson et al. . | |
| 5,157,852 | 10/1992 | Patrou et al. . | |
| 5,188,229 | 2/1993 | Bernstein . | |
| 5,226,532 | 7/1993 | Davidson et al. . | |
| 5,232,087 | 8/1993 | Schluger . | |
| 5,236,081 | 8/1993 | Fitzsimmons et al. . | |
| 5,249,677 | 10/1993 | Lim . | |
| 5,253,751 | 10/1993 | Wipper . | |
| 5,259,133 | 11/1993 | Burtch . | |
| 5,284,242 | 2/1994 | Roth . | |
| 5,289,918 | 3/1994 | Dobias et al. . | |
| 5,310,053 | 5/1994 | Lowry et al. . | |
| 5,317,823 | 6/1994 | Brunt, II . | |
| 5,333,728 | 8/1994 | O'Brien et al. . | |
| 5,360,107 | 11/1994 | Chasin et al. . | |
| 5,366,073 | 11/1994 | Turrentine et al. . | |
| 5,366,074 | 11/1994 | O'Brien et al. . | |
| 5,370,224 | 12/1994 | Karakanem et al. . | |
| 5,372,253 | 12/1994 | O'Brien et al. . | |
| 5,383,553 | 1/1995 | Lammerant et al. . | |
| 5,385,231 | 1/1995 | Nowotny . | |
| 5,386,656 | 2/1995 | Bergman . | |
| 5,396,987 | 3/1995 | Temple et al. . | |
| 5,402,882 | 4/1995 | Bandy et al. . | |
| 5,462,158 | 10/1995 | Kramer | 206/308.1 X |
| 5,613,612 | 3/1997 | Davault | 206/308.1 X |

Primary Examiner—Bryon P. Gehman
Attorney, Agent, or Firm—Kenyon & Kenyon

[57] ABSTRACT

A compact disc holder package is provided containing a three-dimensional pop-up display. The package includes a tray for retaining a compact disc and a pop-up display structure overlaying the tray. The display structure contains first and second panels that are hingedly connected to each other such that they are movable between a folded generally flat configuration and an opened configuration in which they are generally perpendicular. Vertical and horizontal pop-up elements are disposed between the panels and are hingedly connected to the panels and to each other such that when the panels are in the folded configuration, the pop-up elements are collapsed and generally flat and when the panels are moved to the opened configuration, the pop-up elements form a self-erected three-dimensional display.

34 Claims, 5 Drawing Sheets

COMPACT DISC HOLDER PACKAGE CONTAINING A THREE-DIMENSIONAL POP-UP DISPLAY

TECHNICAL FIELD OF THE INVENTION

The present invention relates generally to compact disc holders and, more particularly, to a compact disc holder package containing a decorative pop-up display.

BACKGROUND OF THE INVENTION

Compact discs containing optically readable information are widely used in the computer and recorded music fields. The discs are generally sold and stored in plastic containers commonly known as "jewel boxes," which comprise a tray for retaining the disc and a lid hingedly connected to the tray. Pre-printed inserts containing artwork and information relating to the disc are placed in the tray and the lid. Apart from the inserts, jewel boxes contain no substantial ornamentation, particularly since the containers are designed to have a generally flat configuration for storage. A need exists for compact disc packaging providing additional ornamentation and that can be maintained in a generally flat configuration for storage.

SUMMARY OF THE INVENTION

In accordance with a first embodiment of the invention, decorative outer packaging including a three-dimensional pop-up display is provided for the jewel box. The packaging includes a package base having a rectangular opening leading to a chamber in which the jewel box can be slidably mounted. A three-dimensional pop-up display structure is mounted on the base. The display structure includes first and second panels that are hingedly connected to each other such that they are movable between a folded generally flat configuration and an opened configuration in which they are generally perpendicular. Vertical and horizontal pop-up elements are disposed between the panels and are hingedly connected to the panels and to each other such that when the panels are in the folded configuration, the pop-up elements are collapsed and generally flat and when the panels are moved to the opened configuration, the pop-up elements form a self-erected three-dimensional display.

A compact disc holder package in accordance with a second embodiment of the invention includes a tray for receiving a compact disc and a three-dimensional pop-up display structure hingedly mounted on the tray. As with the first embodiment, the display structure comprises first and second panels that are hingedly connected to each other and pop-up elements disposed between the panels. The display structure can be pivoted from a position covering the tray to a position in which the tray is exposed to permit access to the compact disc.

A compact disc holder package in accordance with a third embodiment of the invention includes a tray for receiving a compact disc, a package base including a chamber therein in which the tray is slidably mounted, and a pop-up display structure affixed to the base. As with the other embodiments, the display structure includes hingedly connected first and second panels with pop-up elements disposed therebetween. The disc holder package also includes a tray ejection mechanism that causes the tray to be simultaneously ejected from the chamber when the first and second panels of the display structure are moved to an opened configuration.

The compact disc holder packages in accordance with the present invention thus provide a decorative three-dimensional display that is collapsible to provide a relatively flat package for storage.

DETAILED DESCRIPTION

Figures 1, 2, 3:
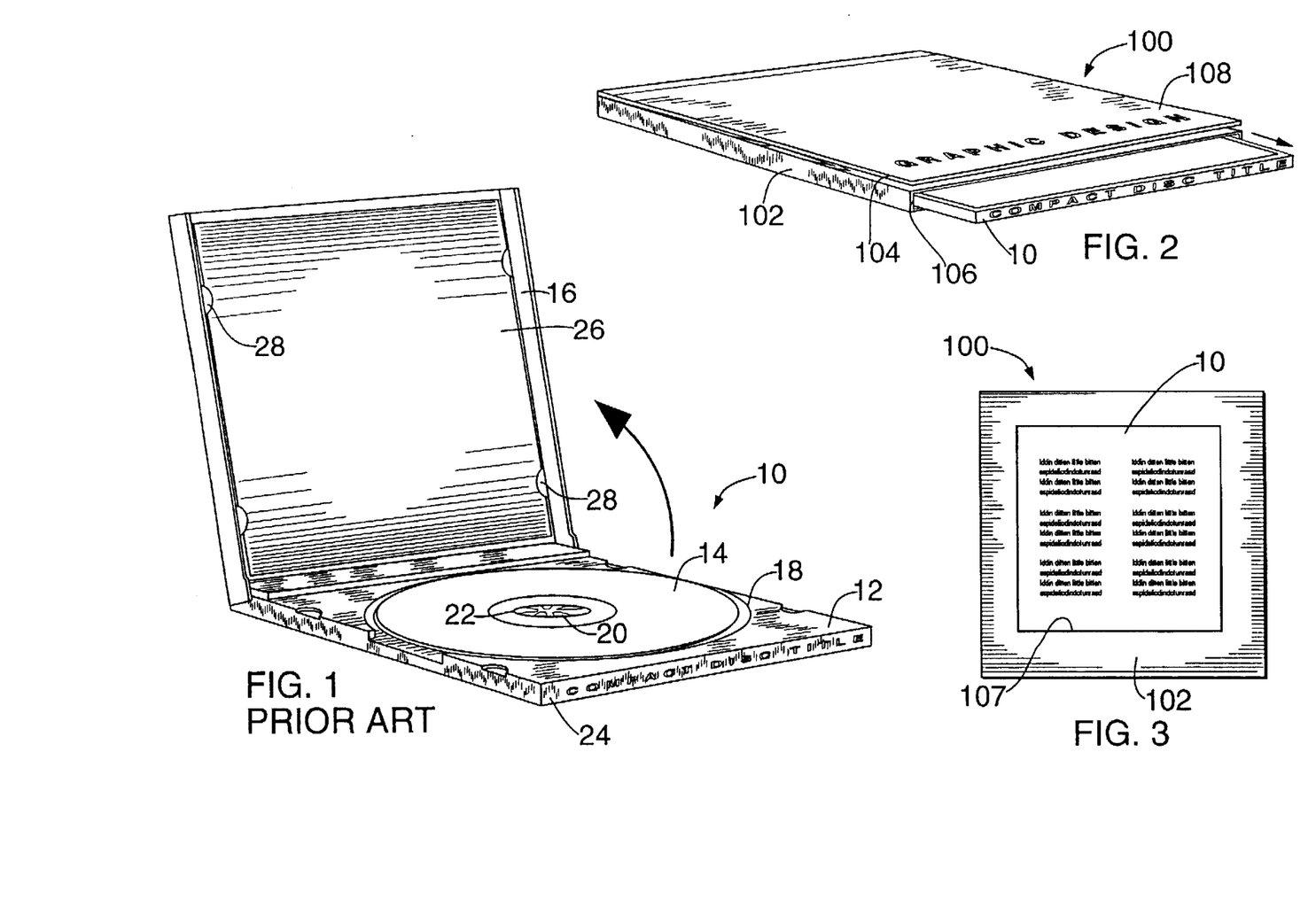
FIG. 1 is a perspective view of a compact disc container in accordance with the prior art.
FIG. 2 is a perspective view of a compact disc holder package shown in a folded configuration in accordance with a first embodiment of the invention with the jewel box partially withdrawn therefrom.
FIG. 3 is a bottom plan view of the FIG. 2 package.

The widely used compact disc container 10 commonly known as a "jewel box" is shown in FIG. 1. The container comprises a tray 12, which is adapted to receive a compact disc 14, and a lid 16 hingedly connected to the rear end of the tray 12.

The tray 12 includes a circular recess 18 in its upper surface for receiving the disc 14. The disc 14 is releasably locked in the recess 18 by means of a centrally located circular array of spring fingers 20 that frictionally engages the edge of the center hole 22 of the disc 14. The disc 14 can be removed from the tray 12 by applying a slight downward force on the array of spring fingers 20, which causes the fingers 20 to disengage the disc 14.

The outer portion of the tray 12 comprises clear plastic. A pre-printed insert 24 placed in the tray is visible through the clear plastic at the bottom and front side of the tray 12. The insert 24 generally includes artwork and information relating to the content of the compact disc 14.

The lid 16, which is shown in an open position in FIG 1 to enable insertion or removal of the disc 14 from the tray 12, can be moved to a closed folded position for storage. The lid 16 comprises clear plastic, and a pre-printed insert 26 like a booklet or a multi-page pamphlet may be held in the lid 16 by means of tabs 28 such that the insert 26 is visible through the lid 16 when the container 10 is closed.

Figure 4:
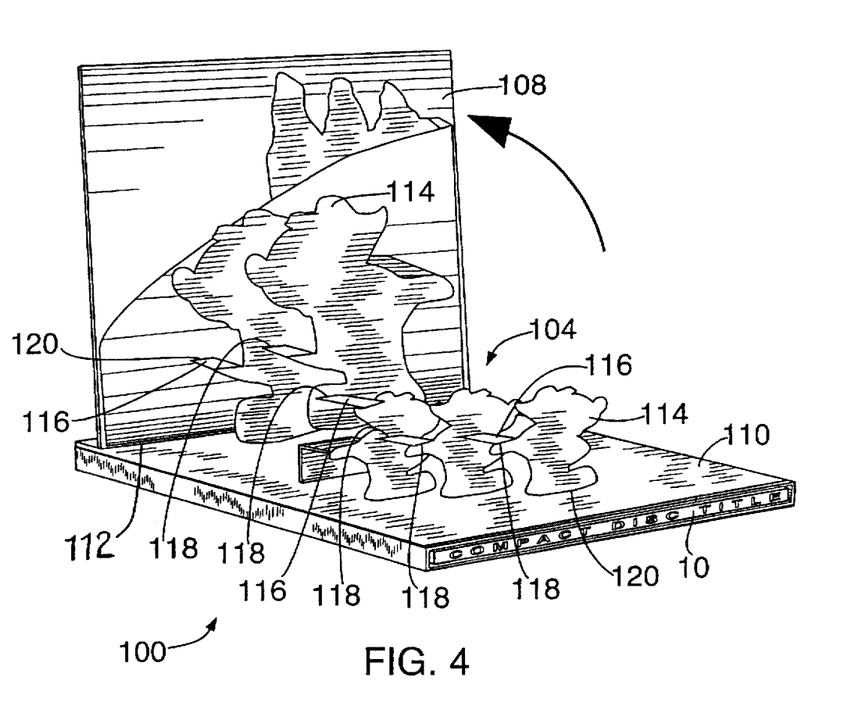
FIG. 4 is a perspective view of the FIG. 2 package shown in an unfolded configuration displaying the three-dimensional pop-up display therein.

A compact disc holder package 100 containing a three-dimensional pop-up display in accordance with the first embodiment of the invention is illustrated in FIGS. 2, 3 and 4. The package 100 includes a disc container 10 of the type shown in FIG. 1 and decorative outer packaging comprising a package base 102 and a pop-up display structure 104 mounted on the base 102. The base 102 includes a rectangular shaped opening 106 at its front side, leading to a cavity or chamber in which the container 10 is slidably mounted. In FIG. 2, the container 10 is shown partially withdrawn from the opening 106. As shown in FIG. 3, the bottom side of the package base 102 includes a large window 107 through which a substantial portion of the bottom side of the container 10 can be viewed. As previously noted, the bottom side of the container 10 may include artwork and information relating to the content of the compact disc. The artwork and information can thus be readily viewed while the container 10 is stored in the package base 102.

In FIG. 2, the three-dimensional display structure 104 of the package is shown in a closed or folded position. In FIG. 4, the display structure 104 is shown in a fully opened position, presenting a decorative three-dimensional scene to the user.

The display structure 104 includes first and second panels 108, 110 that are hingedly joined at their rear ends along a hinge line 112 such that the first panel 108 can be pivoted about the hinge line 112 and opened like a book cover with respect to the second panel 110. The second panel 110 is affixed to the package base 102. The outer surface of the first panel 108, as shown in FIG 2, may include a graphic design or artwork thereon as desired.

As shown in FIG. 4, the display structure 104 also includes a plurality of self-erecting vertical and horizontal pop-up elements 114, 116 disposed between the inner surfaces of the first and second panels 108, 110. The horizontal and vertical elements 116, 114 are hingedly connected to each other along various fold lines 118. Some of the horizontal elements 116 are hingedly connected to the first panel 108 and some of the vertical elements 114 are hingedly connected to the second panel 110 along fold lines 120. The elements 114, 116 are thus arranged to collapse along the fold lines 118, 120 when the first and second panels 108, 110 are folded to the position of FIG. 2. The elements "pop-up" or are drawn to their upright positions as the first panel 108 is opened with respect to the second panel 110.

When the display structure 104 is in an open configuration, the vertical elements 114 are in spaced relationship with each other, and the horizontal elements 116 are also in spaced relationship with each other such that the compilation of the elements 114, 116 depicts a scene in three-dimensional form. The elements 114, 116 and the inner surfaces of the panels 108, 110 are colored or decorated as desired to depict various portions of the three-dimensional scene.

The three-dimensional display structure 104 and the base portion 102 of the package 100 are preferably formed from paper products.

The compact disc holder package 100 thus provides an attractive three-dimensional display that is collapsible to provide a relatively flat package for storage. A user of the package 110 can open and close the display structure 104 to view the three-dimensional display. The user can also easily retrieve the compact disc 14 in the package 100 by sliding the container 10 out of the opening 106 in the package base 102 and thereafter opening the lid 16 to access the disc 14.

Figure 5:
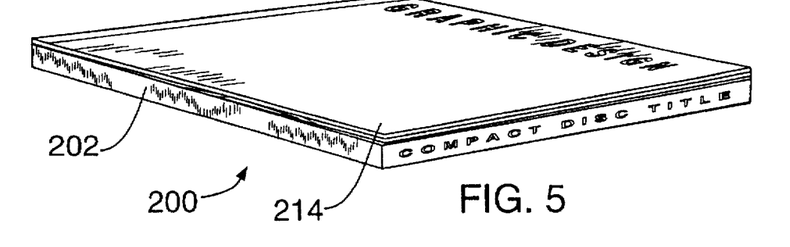
FIG. 5 is a perspective view of a compact disc holder package shown in a folded configuration in accordance with a second embodiment of the invention.
Figure 6:
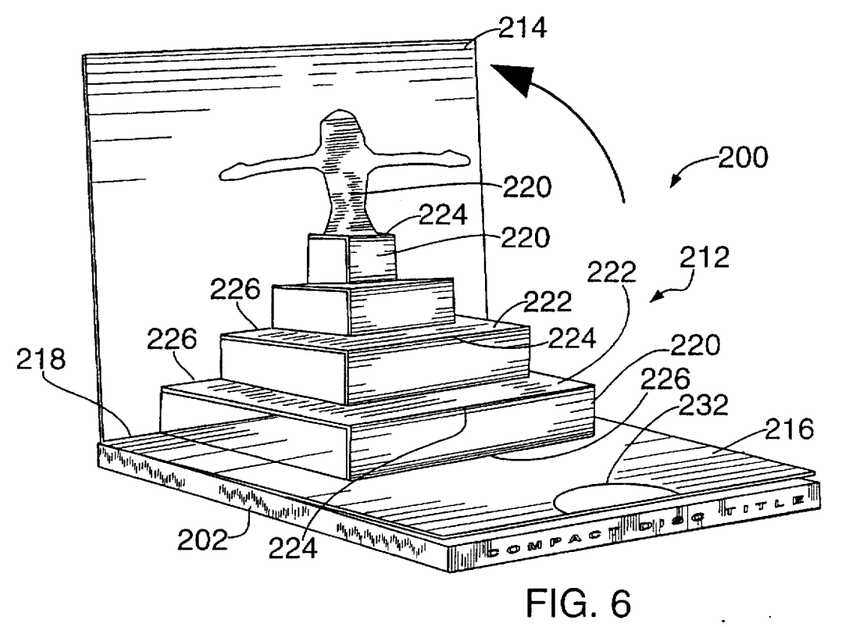
FIG. 6 is a perspective view of the FIG. 5 package shown in one unfolded configuration displaying the three-dimensional pop-up display therein.
Figure 7:
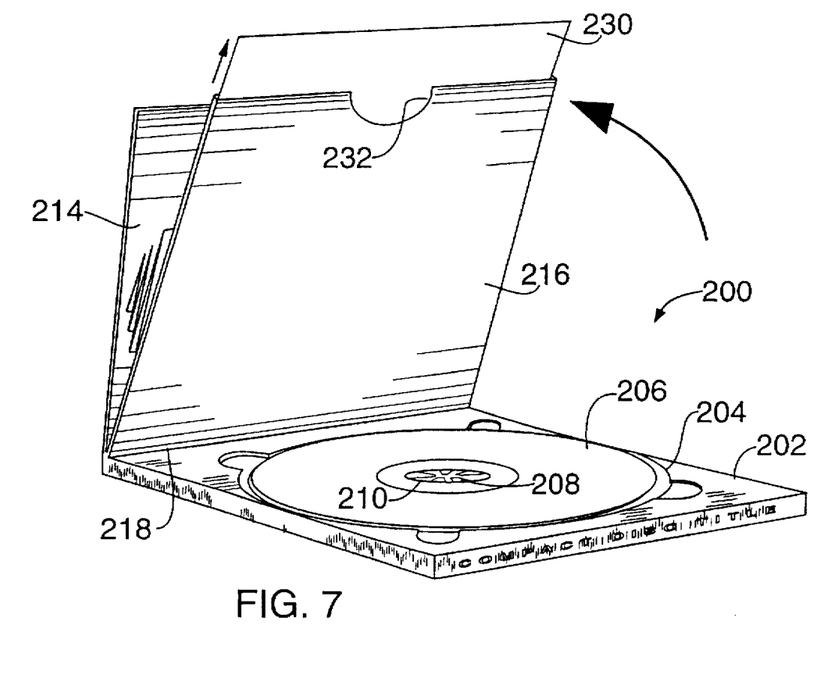
FIG. 7 is a perspective view of the FIG. 5 package shown in a further unfolded configuration for accessing the compact disc therein.

FIGS. 5–7 illustrate a compact disc holder package 200 in accordance with the second embodiment of the invention.

As shown in FIG. 7, the package 200 includes a tray 202 having a circular recess 204 on its upper surface for receiving and supporting the compact disc 206. As with the tray 12 of FIG. 1, the tray 202 includes a centrally located circular array of flexible spring fingers 208 that frictionally engages the edge of the center hole 210 of the disc to releasably lock the disc 206 in place.

The package 200 also includes a pop-up display structure 212 comprising first and second panels 214, 216 hingedly joined at the rear end of the tray along a hinge line 218. Each of the panels can accordingly be pivoted about the hinge line 218 and moved between opened and closed positions. In FIG. 5, the holder package 200 is shown with both panels in closed positions such that the package 200 has a folded, generally flat configuration. The outer surface of the first panel 214 may include a graphic design or artwork thereon as desired.

When the user opens the first panel 214 relative to the second panel 216 and the tray 202, a three-dimensional pop-up display is erected between the inner surfaces of the panels 214, 216 as shown in FIG. 6. As with the pop-up display illustrated in FIG. 4, the pop-up display shown in FIG. 6 comprises a plurality of vertical and horizontal elements 220, 222. The vertical and horizontal elements 220, 222 are hingedly connected to each other along various fold lines 224. At least some of the vertical elements 220 are hingedly connected to the second panel 216 and at least some of the horizontal elements 222 are connected to the first panel 214 along various fold lines 226. As with the display shown in FIG. 4, the elements 220, 222 are self-erecting and are drawn to their upstanding, spaced-apart positions as the first panel 214 is pivoted along the hinge line 218 to an open position with respect to the second panel 216. The display is also collapsible along the fold lines 224, 226 as the first panel 214 is moved to a closed position with respect to the second panel 216.

When the second panel 216 is opened with respect to the tray 202 as shown in FIG. 7, the tray 202 is exposed to the user to allow the compact disc 206 to be removed from or inserted into the package 200.

The second panel 216 may include a slot therein in which printed material like a booklet 230 may be retained. The booklet would generally contain artwork and/or information on the compact disc as desired. The outer edge of the second panel 216 may include a central notch 232 to enable the booklet 230 to be easily grasped and removed.

The display structure 212 preferably comprises paper product material, and the tray 202 preferably comprises plastic material.

Thus, a user of the package 200 can view an attractive three-dimensional display by opening the first panel 214 relative to the second 216. Also, a compact disc 206 stored in the package 200 can be easily accessed by opening the second panel 216 relative to the tray 202.

FIGS. 8–12 illustrate a compact disc holder package 300 containing a three-dimensional pop-up display in accordance with the third embodiment of the invention. The holder package 300 comprises a tray 302 for receiving a compact disc 304, a package base 306 for receiving the tray 302, and a three-dimensional display structure 308 mounted on the package base 306. The holder package 300 also includes a tray ejection mechanism that enables the tray 302 to be automatically ejected from the package base 306 when the display structure 308 is opened.

Figures 8, 9, 10:
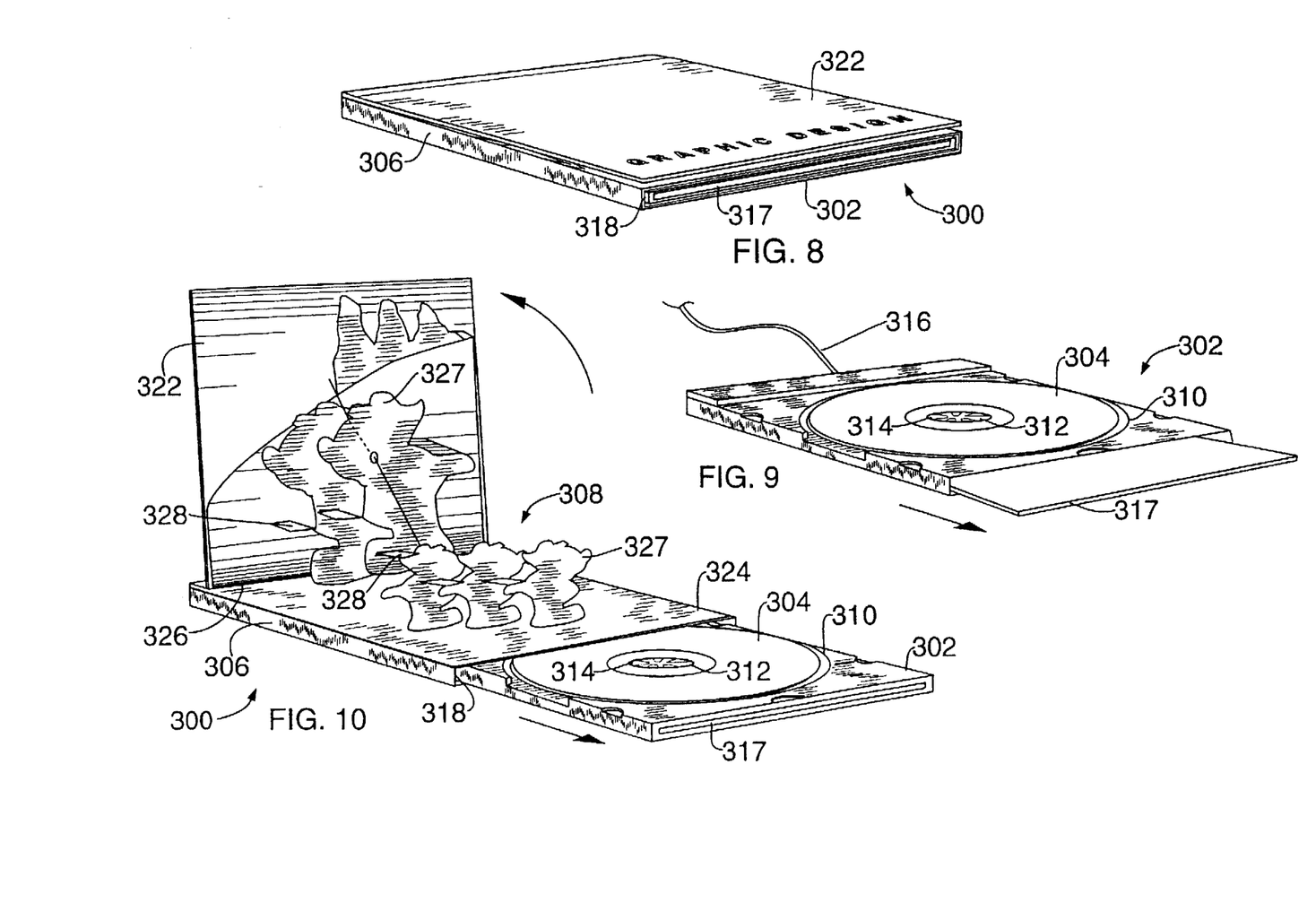
FIG. 8 is a perspective view of a compact disc holder package shown in a folded closed configuration in accordance with a third embodiment of the invention.
FIG. 9 is a perspective view of the tray portion of the FIG. 8 package.
FIG. 10 is a perspective view of the FIG. 8 package shown in an unfolded open configuration displaying the three-dimensional pop-up display therein.
Figures 11, 12:
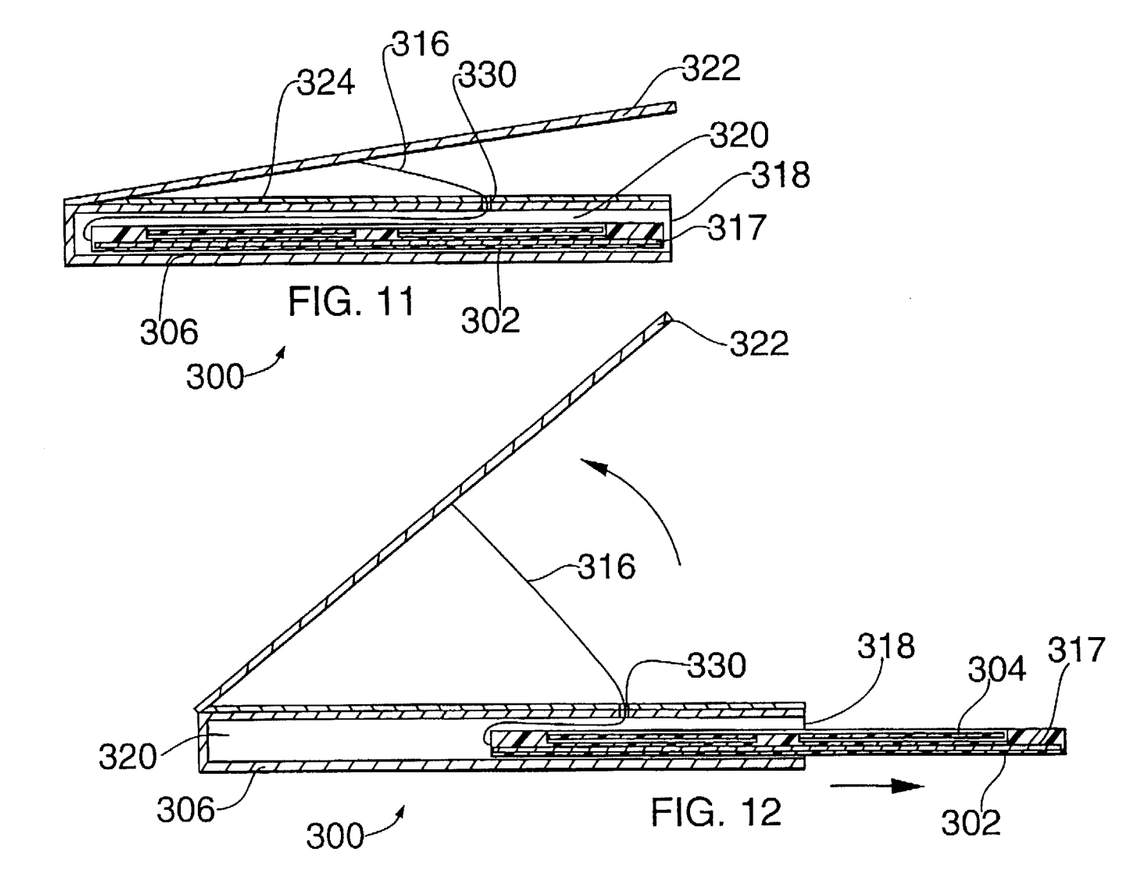
FIG. 11 is a cross-section view of the FIG. 8 package in a slightly opened configuration illustrating the tray ejection mechanism therein.
FIG. 12 is a cross-section view of the FIG. 8 package in a further opened configuration also illustrating the tray ejection mechanism therein.

The tray 302, shown separately in FIG. 9 includes a circular recess 310 for receiving and supporting the compact disc 304 and it includes a centrally located circular array of spring fingers 312 that frictionally engages the center hole edge 314 of the compact disc 304. An elongated flexible member 316 such as a string or a nylon cord comprising a portion of the tray ejection mechanism is affixed to the rear side of the tray 302. The tray 302 includes a slot therein opening at the front side of the tray. Printed material such as a booklet 317 may be slidably retained in the slot. The booklet 317 may include artwork and/or information on the compact disc as desired.

The base portion 306 of the package 300 includes a rectangular opening 318 at its front surface leading to a cavity or chamber 320 in which the tray 320 is slidably mounted.

The pop-up display structure 308 comprises first and second panels 322, 324 hingedly joined to each other along a hinge line 326. The first panel 322 can accordingly be opened and closed like a book cover with respect to the second panel 324. The second panel 324 is affixed to the top of the package base 306. In FIG. 8, the holder package 300 is shown in a closed position such that the package has a folded, generally flat configuration. The outer surface of the first panel 322 may include a graphic design or artwork thereon as desired.

When the user opens the first panel 322 relative to the second panel 324, a three-dimensional pop-up display is erected between the inner surfaces of the panels as shown in FIG. 10. As with the pop-up displays illustrated in FIGS. 4 and 6, the pop-up display shown in FIG. 10 comprises a plurality of vertical and horizontal elements 327, 328 hingedly connected to each other and to the panels 322, 324 along various fold lines. The elements 327, 328 are accordingly drawn to their upstanding, spaced-apart positions as the first panel 322 is pivoted along the hinge line 326 to an open position to form a self-erected three-dimensional display. The display is also collapsible along the fold lines as the first panel 322 is moved to a closed position with respect to the second panel 324.

As the display structure 308 of the package 300 is opened from a closed folded position shown in FIG. 8 to an open position shown in FIG. 10, the tray 302 is simultaneously ejected from the chamber 320 in the package base 306 by means of the tray ejection mechanism. As shown more clearly in FIGS. 11 and 12, which are cross-section views of the package 300, the flexible member 316 attached to the rear of the tray 302 extends through an aperture 330 in the second panel 324 and package base 306 and is attached to the first panel 322. Accordingly, when the first panel 322 is opened with respect to the second panel 324, the flexible member 316 is pulled tightly about the aperture 330 causing the tray 302 to be ejected from the chamber 320. (In FIGS. 11 and 12, the display elements 327, 328 are omitted to more clearly illustrate the tray ejection mechanism.)

Once the tray 302 is in a fully ejected position as shown in FIG. 10, the compact disc 304 can be easily removed by the user. Thereafter, the first panel can be closed and the tray 302 manually pushed into the chamber 320 to cause the package 300 to assume the folded, retracted configuration of FIG. 8. Although not shown, biasing means may be provided to bias the tray 302 in a retracted position such that upon closing the first panel 322, the tray 302 is automatically retracted.

Thus, a user of the package 300 can observe an attractive three-dimensional structure unfold while simultaneously being presented with a compact disc 304 stored in the package 300.

We claim:

1. A compact disc holder package containing a three-dimensional pop-up display, comprising:

a tray for retaining a compact disc; and a pop-up display structure overlaying said tray, said display structure including a first panel and a second panel hingedly connected to each other such that they are movable between a folded generally flat configuration and an opened configuration in which said panels are generally perpendicular, said display structure also including vertical and horizontal pop-up elements disposed between said panels wherein at least one of said vertical elements is hingedly connected to said second panel and at least one of said horizontal elements is hingedly connected to said first panel and wherein each of said horizontal elements is hingedly connected to one of said vertical elements and each of said vertical elements is hingedly connected to one of said horizontal elements such that when said panels are in the folded configuration, the pop-up elements are collapsed and generally flat and when said panels are moved to the opened configuration, said pop-up elements form a self-erected three-dimensional display, wherein said second panel is hingedly connected to said tray such that said second panel is movable between a position in which said second panel covers said tray and a position in which said tray is exposed and the compact disc is accessible.

2. The compact disc holder package of claim 1, wherein said tray includes a circular recess for receiving and supporting the compact disc and further includes a circular array of spring fingers for releasably locking the disc in said recess.

3. The compact disc holder package of claim 1, wherein said display structure comprises paper product material.

4. The compact disc holder package of claim 1, wherein said tray comprises plastic.

5. A compact disc holder package including a three-dimensional pop-up display, comprising:

a tray for retaining a compact disc; and a pop-up display structure comprising a first panel and a second panel hingedly connected to each other and movable between a folded generally flat configuration and an opened configuration in which said panels are generally perpendicular, said display structure also comprising vertical and horizontal pop-up elements disposed between said panels wherein at least one of said vertical elements is hingedly connected to said second panel and at least one of said horizontal elements is hingedly connected to said first panel and wherein said horizontal elements are hingedly connected to said vertical elements such that when said panels are in the folded configuration, the pop-up elements are collapsed and generally flat and when said panels are moved to the opened configuration, said pop-up elements form a self-erecting three-dimensional display, and wherein said second panel is hingedly connected to said tray such that said second panel is movable between a position in which said second panel covers said tray and a position in which said tray is exposed and the compact disc is accessible.

6. The compact disc holder package of claim 5, wherein said tray includes a circular recess for receiving and supporting the compact disc and further includes a circular array of spring fingers for releasably locking the disc in said recess.

7. The compact disc holder package of claim 5, wherein said display structure comprises paper product material.

8. The compact disc holder package of claim 5, wherein said tray comprises plastic.

9. A decorative package for a compact disc, comprising:
a compact disc jewel box container, the container including a tray for receiving and releasably securing a compact disc therein and a lid hingedly connected to the tray for removably covering said tray; and
an outer package, the outer package comprising:
a package base portion including an opening leading to a chamber, said chamber being sized to enable the compact disc container to be slidably mounted therein; and
a pop-up display structure including a first panel and a second panel hingedly connected to each other such that they are movable between a folded generally flat configuration and an opened configuration in which said panels are generally perpendicular, said display structure also including vertical and horizontal pop-up elements disposed between said panels wherein at least one of said vertical elements is hingedly connected to said second panel and at least one of said horizontal elements is hingedly connected to said first panel and wherein said horizontal elements are hingedly connected to said vertical elements such that when said panels are in the folded configuration, the pop-up elements are collapsed and generally flat and when said panels are moved to the opened configuration, said pop-up elements form a self-erected three-dimensional display, and wherein said second panel is affixed to said package base portion.

10. The decorative package of claim 9, wherein said outer package comprises paper product material.

11. The decorative package of claim 9, wherein the package base portion includes a bottom side having a window extending therethrough for enabling a bottom side of the container to be viewed through the window.

12. A compact disc holder package containing a three-dimensional pop-up display, comprising:
a tray for retaining a compact disc;
a pop-up display structure including a first panel and a second panel hingedly connected to each other such that they are movable between a folded generally flat configuration and an opened configuration in which said panels are generally perpendicular, said display structure also including vertical and horizontal pop-up elements disposed between said panels wherein at least one of said vertical elements is hingedly connected to said second panel and at least one of said horizontal elements is hingedly connected to said first panel and wherein said horizontal elements are hingedly connected to said vertical elements such that when said panels are in the folded configuration, the pop-up elements are collapsed and generally flat and when said panels are moved to the opened configuration, said pop-up elements form a self-erected three-dimensional display;
a package base including an opening leading to a chamber, wherein said second panel is affixed to said package base and said tray is slidably mounted in said chamber; and
means for simultaneously ejecting said tray from said opening when said panels are moved from the folded configuration to the opened configuration.

13. The compact disc holder package of claim 12, wherein said tray includes a circular recess for receiving and supporting the compact disc and further includes a circular array of spring fingers for releasably locking the disc in said recess.

14. The compact disc holder package of claim 12, wherein said display structure and said base portion comprise paper product material.

15. The compact disc holder package of claim 12, wherein said tray comprises plastic.

16. The compact disc holder package of claim 12, wherein said means comprise a flexible member affixed at one end to said tray and at an opposite end to said first panel, wherein said flexible member extends through an aperture in said second panel such that said tray is caused to be ejected from said opening when said panels are moved from the folded configuration to the opened configuration.

17. The compact disc holder package of claim 16, wherein said flexible member comprises a string.

18. The compact disc holder package of claim 16, wherein said flexible member comprises a nylon cord.

19. The compact disc holder package of claim 12, wherein said tray includes a slot for receiving printed material therein.

20. A method of retrieving a compact disc from a compact disc holder package comprising a package base, a pop-up display structure mounted on said base, and a tray retaining the compact disc slidably mounted in the package base, said holder package having a folded, generally flat configuration for storage, the method comprising the steps of:
erecting a three-dimensional display by unfolding the pop-up display structure and simultaneously ejecting the tray from the package base to expose the compact disc; and
removing the compact disc from the tray.

21. The method of claim 20, wherein said display structure comprises a first panel and a second panel hingedly connected to each other and a plurality of vertical and horizontal pop-up elements disposed between the panels and hingedly connected to the panels and to each other, and wherein said step of erecting a three-dimensional display comprises pivoting said first panel with respect to said second panel from a generally flat, folded configuration to an unfolded configuration wherein said panels are substantially perpendicular.

22. A decorative package for a compact disc, comprising:
a compact disc container, said container including a tray for receiving and releasably securing a compact disc therein and a lid hingedly connected to the tray for removably covering the tray; and
an outer package, the outer package comprising:
a base portion including an opening leading to a chamber therein, said chamber and opening configured to enable the compact disc container to be slidably and removably mounted therein; and
means overlaying said base portion for forming a self-erected three-dimensional display.

23. The decorative package of claim 22, wherein said means comprise a pop-up display structure including a first panel and a second panel hingedly connected to each other such that they are movable between a folded generally flat configuration and an opened configuration in which said panels are generally perpendicular, said display structure also including vertical and horizontal pop-up elements disposed between said panels wherein at least one of said vertical elements is hingedly connected to said second panel and at least one of said horizontal elements is hingedly connected to said first panel and wherein each of said horizontal elements is hingedly connected to one of said vertical elements and each of said vertical elements is hingedly connected to one of said horizontal elements such that when said panels are in the folded configuration, the pop-up elements are collapsed and generally flat and when said panels are moved to the opened configuration, said pop-up elements form a self-erected three-dimensional display.

24. The decorative package of claim 22, wherein said base portion includes a bottom side having a window therein through which a bottom side of the compact disc container can be viewed.

25. A compact disc holder package, comprising:
a tray for retaining a compact disc;
means overlaying said tray for forming a self-erected three-dimensional display;
a package base including an opening leading to a chamber, wherein said means overlaying said tray are affixed to said package base and said tray is slidably mounted in said chamber; and
tray ejection means for simultaneously ejecting said tray from said opening when said self-erected three-dimensional display is formed.

26. A compact disc holder package, comprising:
a tray for retaining a compact disc, said tray including a recess for receiving the compact disc and including means for releasably locking the disc in said recess; and
means overlaying said tray for forming a self-erected three-dimensional display, wherein said means overlaying said tray are hingedly connected to said tray such that said means are pivotable away from said tray to expose the compact disc in the recess of the tray.

27. A compact disc holder package containing a three-dimensional pop-up display, comprising:
a tray for retaining a compact disc;
a package base including an opening leading to a chamber, wherein said tray is slidably mounted in said chamber;
a pop-up display structure overlaying said tray, said display structure including a first panel and a second panel hingedly connected to each other such that they are movable between a folded generally flat configuration and an opened configuration in which said panels are generally perpendicular, said display structure also including vertical and horizontal pop-up elements disposed between said panels wherein at least one of said vertical elements is hingedly connected to said second panel and at least one of said horizontal elements is hingedly connected to said first panel and wherein each of said horizontal elements is hingedly connected to one of said vertical elements and each of said vertical elements is hingedly connected to one of said horizontal elements such that when said panels are in the folded configuration, the pop-up elements are collapsed and generally flat and when said panels are moved to the opened configuration, said pop-up elements form a self-erected three-dimensional display, wherein said second panel is affixed to said package base; and
tray ejection means for simultaneously ejecting said tray from said opening when said panels are moved from the folded configuration to the opened configuration.

28. The compact disc holder package of claim 27, wherein said package base includes a bottom side having a window therein through which a bottom side of the tray can be viewed.

29. A compact disc holder package containing a three-dimensional pop-up display, comprising:
a tray for retaining a compact disc;
a package base including an opening leading to a chamber, wherein said tray is slidably mounted in said chamber;
a pop-up display structure overlaying said tray, said display structure including a first panel and a second panel hingedly connected to each other such that they are movable between a folded generally flat configuration and an opened configuration in which said panels are generally perpendicular, said display structure also including vertical and horizontal pop-up elements disposed between said panels wherein at least one of said vertical elements is hingedly connected to said second panel and at least one of said horizontal elements is hingedly connected to said first panel and wherein each of said horizontal elements is hingedly connected to one of said vertical elements and each of said vertical elements is hingedly connected to one of said horizontal elements such that when said panels are in the folded configuration, the pop-up elements are collapsed and generally flat and when said panels are moved to the opened configuration, said pop-up elements form a self-erected three-dimensional display, wherein said second panel is affixed to said package base; and
an elongated flexible member affixed at one end to said tray and at an opposite end to said first panel, and wherein said flexible member extends through an aperture in said second panel such that said tray is caused to be ejected from said opening when said panels are moved from the folded configuration to the opened configuration.

30. The compact disc holder package of claim 29, wherein said flexible member comprises a string.

31. The compact disc holder package of claim 29, wherein said flexible member comprises a nylon cord.

32. A compact disc holder package containing a three-dimensional pop-up display, comprising:
a tray for retaining a compact disc, said tray including a slot for receiving printed material therein; and
a pop-up display structure overlaying said tray, said display structure including a first panel and a second panel hingedly connected to each other such that they are movable between a folded generally flat configuration and an opened configuration in which said panels are generally perpendicular, said display structure also including vertical and horizontal pop-up elements disposed between said panels wherein at least one of said vertical elements is hingedly connected to said second panel and at least one of said horizontal elements is hingedly connected to said first panel and wherein each of said horizontal elements is hingedly connected to one of said vertical elements and each of said vertical elements is hingedly connected to one of said horizontal elements such that when said panels are in the folded configuration, the pop-up elements are collapsed and generally flat and when said panels are moved to the opened configuration, said pop-up elements form a self-erected three-dimensional display, wherein said second panel is hingedly connected to said tray such that said second panel is movable between a position in which said second panel covers said tray and a position in which said tray is exposed and the compact disc is accessible.

33. A compact disc holder package containing a three-dimensional pop-up display, comprising:
a tray for retaining a compact disc; and
a pop-up display structure overlaying said tray, said display structure including a first panel and a second panel hingedly connected to each other such that they are movable between a folded generally flat configuration and an opened configuration in which said panels are generally perpendicular, said display structure also including vertical and horizontal pop-up elements disposed between said panels wherein at least one of said vertical elements is hingedly connected to said second panel and at least one of said horizontal elements is hingedly connected to said first panel and wherein each of said horizontal elements is hingedly connected to one of said vertical elements and each of said vertical elements is hingedly connected to one of said horizontal elements such that when said panels are in the folded configuration, the pop-up elements are collapsed and generally flat and when said panels are moved to the opened configuration, said pop-up elements form a self-erected three-dimensional display, wherein said second panel is hingedly connected to said tray such that said second panel is movable between a position in which said second panel covers said tray and a position in which said tray is exposed and the compact disc is accessible, and wherein one of said panels includes a slot therein for receiving printed material therein.

34. A compact disc holder package containing a three-dimensional pop-up display, comprising:

a tray for retaining a compact disc; and a pop-up display structure overlaying said tray, said display structure including a first panel and a second panel hingedly connected to each other such that they are movable between a folded generally flat configuration and an opened configuration in which said panels are generally perpendicular, said display structure also including vertical and horizontal pop-up elements disposed between said panels wherein at least one of said vertical elements is hingedly connected to said second panel and at least one of said horizontal elements is hingedly connected to said first panel and wherein each of said horizontal elements is hingedly connected to one of said vertical elements and each of said vertical elements is hingedly connected to one of said horizontal elements such that when said panels are in the folded configuration, the pop-up elements are collapsed and generally flat and when said panels are moved to the opened configuration, said pop-up elements form a self-erected three-dimensional display, wherein said second panel is hingedly connected to said tray such that said second panel is movable between a position in which said second panel covers said tray and a position in which said tray is exposed and the compact disc is accessible, and wherein said second panel includes a slot for receiving printed material therein.

* * * * *